United States Patent [19]

Rath et al.

[11] Patent Number: 4,706,783
[45] Date of Patent: Nov. 17, 1987

[54] AUTOMATIC ADJUSTING DEVICE FOR A BRAKE

[75] Inventors: Heinrich-Bernhard Rath, Vallendar; Dietrich Holz, Niederbachheim, both of Fed. Rep. of Germany

[73] Assignee: Lucas Industries public limited company, Birmingham, England

[21] Appl. No.: 874,174

[22] PCT Filed: Sep. 12, 1985

[86] PCT No.: PCT/EP85/00459
§ 371 Date: May 13, 1986
§ 102(e) Date: May 13, 1986

[87] PCT Pub. No.: WO86/01866
PCT Pub. Date: Mar. 27, 1986

[30] Foreign Application Priority Data

Sep. 14, 1984 [DE] Fed. Rep. of Germany ....... 8427187

[51] Int. Cl.⁴ ............................................. F16D 51/52
[52] U.S. Cl. .................... 188/79.5 B; 188/196 BA; 188/79.5 R
[58] Field of Search ................ 188/79.5 B, 79.5 GE, 188/79.5 SC, 79.5 R, 196 B, 196 BA, 196 D, 71.8, 71.9; 192/111 A

[56] References Cited

U.S. PATENT DOCUMENTS

| | | | |
|---|---|---|---|
| 2,264,454 | 12/1941 | Para | 188/79.5 B |
| 2,292,017 | 8/1942 | Smith | 188/79.5 B |
| 4,502,573 | 3/1985 | Carre | 188/79.5 GE |

FOREIGN PATENT DOCUMENTS

| | | |
|---|---|---|
| 3019214 | 12/1980 | Fed. Rep. of Germany . |
| 3019223 | 12/1980 | Fed. Rep. of Germany . |
| 3218788 | 12/1982 | Fed. Rep. of Germany . |
| 3244872 | 6/1984 | Fed. Rep. of Germany . |
| 2088977 | 6/1982 | United Kingdom ........... 188/79.5 B |

Primary Examiner—Andres Kashniow
Assistant Examiner—Robert J. Oberleitner
Attorney, Agent, or Firm—Scrivener and Clarke

[57] ABSTRACT

An adjusting device (24,34) of an automatically adjustable shoe drum brake has an at least partly movable locking member (46) associated with it which cooperates with a heat sensitive spring element (50) and prevents pivoting of an adjusting lever (34) and consequently variation in length of a strut (24) in response to the magnitude of a predeterminable brake actuating force and/or a temperature. A loss distance caused by the movement of at least part of the locking member (46) is reduced by a change in rigidity and/or shape of the spring element (50) at rising temperature, in response to the temperature, and completely cancelled . . . reaching a predeterminable value of the temperature.

12 Claims, 7 Drawing Figures

AUTOMATIC ADJUSTING DEVICE FOR A BRAKE

The invention relates to an automatic adjusting device for a brake, especially a motor vehicle brake with which a strut is connected in parallel with a brake actuator and has an effective length which depends on the relative positions of two strut members adjustable with respect to each other and one of them having an adjustable portion which tends to extend the strut, by this portion, upon actuation of the brake and cooperates with at least one intermediate member arranged at least partly between a web plate and a piston to transmit the brake actuating force independently of the strut and being movable at least in part as long as the brake actuating force does not exceed a predeterminable amount.

In a known adjuster of this kind (DE-OS No. 32 44 872) a pivotable, disc-like strut member has a knurled portion which is disposed eccentrically with respect to the pivot axis and movable transversely of the longitudinal direction of the strut. In released condition of the brake the knurled portion engages a knurled portion which is formed at the second strut member. By an arm the disc-like strut member engages in a recess in the web plate. Upon actuation of the brake the two strut members move apart and the disc-like strut member is pivotable by the arm such that, upon release of the brake, a part of the knurled portion more remote from the pivot axis enters into contact with the knurled portion of the second strut member. Hereby the length of the strut is increased for automatic compensation of clearance resulting from wear of the friction lining of the brake shoes.

Another known adjusting device of this kind (DE-OS No. 30 19 223) comprises a strut whose adjustable portion comprises a threaded bolt. The length of the strut is variable by a pinion connected with the threaded bolt when the pinion is rotated by a pivotably supported adjusting member engaging the same. Moreover, the length of the strut is variable in length by means of a built-in bimetal strip. Hereby the adjusting device balances undue clearance between the friction lining and a brake drum caused by wear of the friction lining of the brake shoes, whereas any clearance caused by expansion of the brake drum due to the heat development during braking does not lead to any change in length of the strut and thus to excessive adjustment.

Likewise known is an automatic adjuster (DE-OS No. 30 19 214) with which the adjusting member can be disengaged by means of a bimetal strip so that clearance due to thermal expansion of the brake drum does not lead to a change in length of the strut.

The clearance to be compensated is a clearance to ease the brake corresponding to the difference between the brake drum diameter and the diameter of the brake shoes with the brake in inactive and unheated condition.

The diameter of the brake shoes can be determined by an axial line extending vertically to the connecting line of the hydraulic actuator with the center of the brake drum. The clearance to ease the brake results in a loss distance which may be increased still further by thermal expansion of the brake drum at high temperatures and by the elastic deformation due to high brake actuating forces. This proportion is of influence especially in brakes of weight-saving light structure.

Likewise known are brakes with which an additional loss distance is passed upon actuation of the brake so as to prevent pivoting of the adjusting lever in response to the value of the brake actuating force. To fulfill this function, this loss distance is required only with cold brakes; with the known embodiments it remains unchanged also with the brake already heated.

In general, the loss distance is of less importance in an unheated brake than in a highly heated brake because in this event the hydraulic actuator must be subjected to higher pressure in order to compensate a reduction of the frictional value of a friction lining caused by the heating. If the loss distance is too great, the volume of brake fluid supplied by a main cylinder no longer may be sufficient to build up the required brake pressure so that in this event the braking effect is limited. Furthermore, build-up of the brake actuating pressure is impossible while the loss distance is being passed and this may lead to a delay of the initiation of the braking effect.

It is the object of the invention to develop an automatic adjusting device for a brake such that the adjustment depends both on the temperature generated during braking and on the actuating force and that the loss distance required to prevent excessive adjustment because of the amount of the brake actuating force diminishes at rising temperature.

The object is met, in accordance with the invention, in an automatic adjusting device of the kind specified initially in that the intermediate member is a locking member the side of which facing the piston of the hydraulic actuator protrudes beyond the side of the web plate facing the piston a predetermined salient distance with respect to the side of the web plate facing the piston, when the brake is at rest, so that the brake actuating force is transmissible from the piston to the web plate by way of the locking member until the salient distance which is being reduced by the movement of the locking member has been cancelled and the piston abuts against the opposing side of the web plate, a heat sensitive spring element cooperates with the locking member, the rigidity and/or the shape of the spring being variable at rising temperature of the brake such that movement of the locking member results, whereby the salient distance is reduced, the locking member is connectable with an adjusting member adjusting the portion of the one strut member such that movement of the adjustable portion for varying the length of the strut is prevented upon reaching of a predetermined, temperature-responsive amount of the brake actuating force and/or a predetermined value of the temperature.

By transmission of the brake actuating force from a piston to the side of a locking member forming a salient portion of the brake which is cold during the inoperative state, at least part of the locking member is moved. The locking member is connectable with the adjusting member in response to the displacement thus caused of the locking member and, therefore, in response to the amount of the brake actuating force so that a change of the length of the strut is prevented as a predetermined value of the brake actuating force is reached.

The presence of a heat sensitive spring element the rigidity and/or configuration of which is variable at rising temperature of the brake and which cooperates with the locking member causes the displacement of the locking member to take place also in response to temperature variations. Upon reaching of a predeterminable temperature, the locking member enters into engagement with the adjusting lever so that even if the value of the brake actuating force still is below the predeterminable value, a variation of the length of the strut consequently is prevented as well.

The cooperation of the heat sensitive spring element with the locking member further has the effect that at rising temperature the amount of the actuating force diminishes upon reaching of which the locking member enters into engagement with the adjusting member so that variation in length of the strut is prevented. The result thus is an overlapping of the influences of the brake actuating force and the temperature of the brake so that the locking member is moved into engagement with the adjusting member by the sum of these influences in order to prevent excessive adjustment of the length of the strut as a predeterminable value of the brake actuating force and/or temperature is reached.

The cooperation of the heat sensitive spring element with the locking member further has the effect of reducing the salient distance of the side of the locking member adjacent the piston at rising temperature and of cancelling it altogether as a predetermined temperature is reached. In this manner the loss distance caused by the salient distance is reduced at rising temperature.

The result thereof is quick response of the brake and maintenance of the braking effect even at high temperatures. This requires that the hydraulic pressure in the actuator is increased in order to balance a drop in braking effect caused by a reduction of the frictional value of a friction lining. Too great a loss distance would be opposed to that as the volume of the hydraulic fluid furnished by a main cylinder no longer would be sufficient to build up the necessary pressure so that the braking effect consequently would be limited. Furthermore, the brake actuating pressure cannot be increased as the loss distance is being passed so that the reduction of the loss distance in accordance with the invention leads to quick response of the brake and to increased effectiveness of the brake because the brake actuating pressure can be raised more quickly. The limitation of the level of the brake actuating pressure resulting from bridging of a loss distance is not applicable either.

In a preferred embodiment the locking member is designed as a locking lever which is pivotably connected to the web plate by means of a bolt. The connection of the locking member with the adjusting member designed as an adjusting lever results in especially advantageous manner by the engagement of a locking tooth formed at the locking lever in a locking serration formed at the adjusting lever. The heat sensitive spring element cooperating with the locking member consists of a bimetal strip bent to oval shape and having an outer metal strip which expands more strongly than the inner metal strip at rising temperature so that the rigidity of the spring diminishes as the temperature increases. The fact that both ends of the bimetal strip form one longitudinal side of the oval in overlapping condition has the result that the ends may curve freely even at very high temperatures so that no plastic deformations occur.

In another preferred embodiment a torsion spring acts on the locking lever to establish the salient portion of the locking lever with respect to the web plate. Bimetal plate springs arranged one behind the other act against the locking lever contrary to the effect of the torsion spring. The bimetal plate springs which are supported at a lining backplate are of such nature that their axial length increases at rising temperature. In this manner the locking lever is pivoted under the influence of temperature increase as well as under the influence of a brake actuating force such that its locking tooth approaches the locking serration of the adjusting lever and prevents pivoting movement of the adjusting lever upon reaching of predeterminable values of the temperature and/or the actuating pressure.

Even upon engagement of the locking tooth in the locking serration the bimetal plate springs attempt to expand in axial direction as the temperature rises so that conveniently the locking tooth is connected elastically with the locking lever in order to prevent plastic deformation of the bimetal plate springs.

In another preferred embodiment the heat sensitive spring element is designed to be part of the locking member. The biased spring element in this case has a U-shaped portion in the central section of which there are exposed lips having facing, convexly curved faces to receive an end portion of a connecting rod the other end of which is connected to the adjusting lever. These lips are adapted to clamp the connecting rod when the brake actuating force acting on the salient portion of the spring element reaches a predeterminable value and/or when the spacing between the two lips of the U-shaped portion formed by a bimetal strip is reduced because of a rise in temperature.

In another preferred embodiment the strut comprises a disc-shaped first strut member designed as the adjusting member and connected pivotably with a rod-shaped second strut member in a direction transversely of the longitudinal direction of the strut and so as to be displaceable against the force of a spring. The first strut member has an outer surface which is eccentrical with respect to the pivot axis and has a knurled portion in engagement with a knurled portion of the second strut member when the brake is at rest. The first strut member is pivotable by an arm which engages in a recess in the web plate as the brake is actuated. Upon actuation of the brake, furthermore, relative movement of the first and second strut members away from each other takes place. Because of the pivoting of the first strut member upon actuation of the brake a part of the knurled portion which is more remote from the pivot axis will be in engagement with the knurled portion of the second strut member to increase the length of the strut when the brake subsequently is released. An extension of the strut is prevented regardless of the amount of the brake actuating force and/or the temperature by a locking member being connected pivotably with the web plate and having a locking tooth which is adapted to be caught in a locking serration formed at the first strut member so as to prevent pivoting of this strut member. The salient distance is reduced in response to the temperature and the dependence on the temperature is established of that amount of the brake actuating force upon reaching of which a change in length of the strut is prevented, by the fact that the heat sensitive spring element is pivoted at the web and acts against the locking member.

It proved to be convenient to set a salient distance amounting to approximately 0.2 mm when the brake is at rest. It is further advantageous to cancel this salient distance by the effect of the heat sensitive element when the temperature has reached a value of about 150° C. The magnitude of the bias to be given the spring element conveniently has proved to be an amount of approximately 400 N.

Further advantageous modifications of the embodiments result from the subclaims.

Embodiments of the invention will be described further below with reference to diagrammatic drawings, in which.

Figure 1:
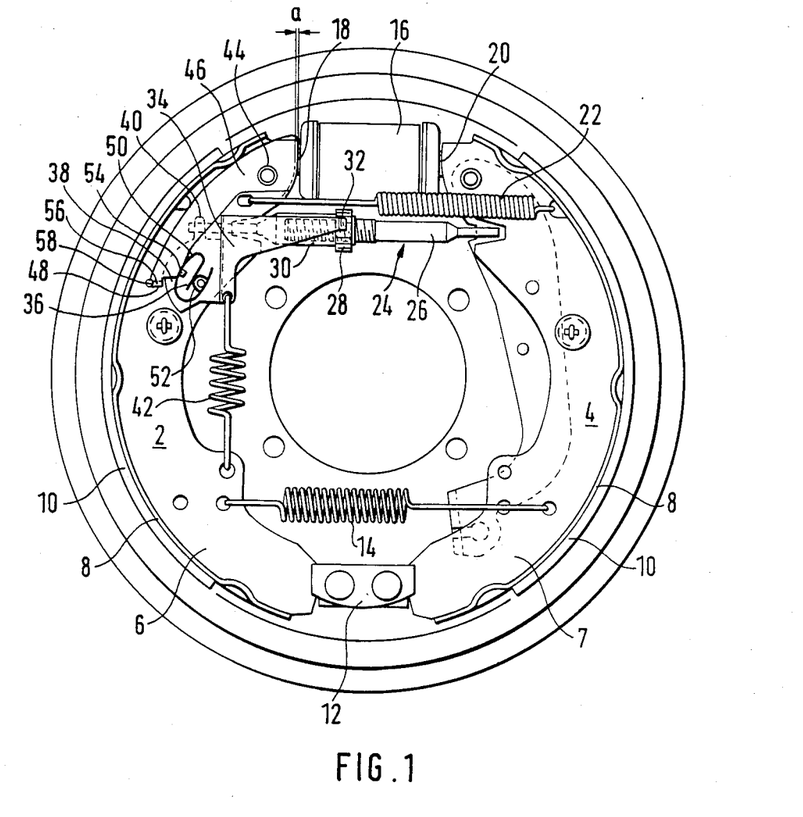
FIG. 1 is a front elevation of a first embodiment.

The brake shown in FIG. 1 comprises a first brake shoe 2 and a second brake shoe 4, each including a web plate 6, 7 followed at the radially outer end by a respective lining backplate 8 to which the brake lining 10 is fixed. The two brake shoes 2, 4 are supported at one end each on a thrust bearing 12 against which they are biased by at least one return spring 14. An hydraulic actuator 16 including two pistons 18, 20 extends between the ends of the brake shoes 2, 4 opposite the thrust bearing 12, and piston 20 thereof acts on the opposing end of the web plate 7 of the second brake shoe 4. A shoe restoring spring 22 connected at one end each to one of the brake shoes 2, 4 is arranged radially inwardly adjacent the hydraulic actuator 16. Radially inwardly of the shoe restoring spring 22 and in parallel with the axis of the actuator 16 a strut 24 is disposed between the two brake shoes 2, 4. The two ends of the strut are bifurcated for engagement in notches formed at the web plates. The strut 24 comprises a spindle 26 which is connected to the web plate 7 and with which a pinion 28 is connected. A sleeve 30 of the strut 24 borders on the side of the pinion 28 opposite the spindle 26.

The pinion 28 is engaged by a pawl 32 formed at one end of an adjusting lever 34 which is pivotably connected with the web plate 6 by means of a bolt 36. At the end adjacent the bolt 36 the adjusting lever 34 comprises a portion of circular sector shape provided with a locking serration 38. At the end of the portion of circular sector shape adjacent the strut 24 the adjusting lever comprises a projection 40 which is guided in a slit of the bifurcated end of the sleeve 30. One end of an adjusting spring 42 is connected with the adjusting lever 34, while the other end is attached to the web plate 6.

At the end adjacent the piston 18 of the web plate 6 a locking lever 46 is supported, pivotable with the same about a bolt 44. The end of the locking lever 46 facing the piston 18 has a curved surface which protrudes by a predetermined salient distance a beyond the end of the web plate 6 opposite the piston 18 as long as the brake is at rest and not heated substantially. At its other end the locking lever 46 comprises a locking tooth 48 for engagement in the locking serration 38 of the adjusting lever 34.

A spring 50 bent to oval shape of a bimetal strip extends between the bolt 36 and the opposing side of the locking lever 46. Overlapping each other at a distance, the two ends of the bimetal strip form one longitudinal side of the oval which is connected to the bolt 36 by an eye 52 formed at the outer end of the bimetal strip. The longitudinal side of the oval opposite the eye 52 engages one side of the locking lever 46 and is formed with a recess into which projects a projection 54 formed at the locking lever 46 to establish a connection with the spring 50. Adjacent the locking tooth 48, the locking lever 46 has a bent over portion as a stop 56 for cooperation with an abutment bolt 58 connected to the web plate 6, cooperating such that the spring 50 is biased by approximately 50 N as long as it is in cold condition.

The bimetal strips of the spring 50 are so arranged that the outer metal strip elongates more than the inner metal strip as the temperature rises so that the characteristic of spring 50 drops in correspondence with a reduction of the rigidity at increasing temperature. The overlapping ends of the spring 50 may become displaced freely even at very high temperatures so that no plastic deformation occurs of the spring 50.

In this condition the end of the locking lever 46 which is disposed opposite the piston 18 and the salient distance a of which is approximately 0.2 mm with the brake in released, cold state is in permanent engagement with the piston 18. Any brake actuating force applied by the piston 18 acts by way of the locking lever 46 and the bolt 44 on the web plate 6 as long as the temperature of the brake does not exceed a predeterminable value, such that the brake lining 10 is pressed against a brake drum (not shown). Besides effecting contact pressure of the brake lining 10, the brake actuating force introduced into the locking lever 46 also causes pivoting of the locking lever 46 about the bolt 44, the spring pressure of the spring 50 counteracting the pivoting movement.

The brake actuating forces acting through the pistons 18, 20 on the brake shoes 2, 4 permit pivoting of the adjusting lever 34 by the pulling force exerted by the adjusting spring 42 because then the projection 40 no longer holds the adjusting lever 34 in its original position in the bifurcated end of the sleeve 30. The pivoting of the adjusting lever 34 may have the result that the pinion 28 is rotated on by the pawl 32, thus increasing the length of the strut 24 for example in the manner described in DE-OS No. 32 18 788. The increase in length of the strut 24 prevents an increase of the clearance to ease the brake because of wear of the brake linings 10. The clearance to ease the brake designates the difference of the diameter of the brake drum and the diameter of the brake shoes with the brake not actuated and cold. The diameter of the brake shoes 2, 3 is measured by way of an axial line disposed vertically with respect to the connecting line between the actuator 16 and the thrust bearing 12.

When the brake actuating force has reached a predeterminable value, the locking tooth 48 engages in the locking serration 38 whereby pivoting movement of the adjusting lever 34 is avoided. This serves to prevent any expansion of the brake drum because of elastic deformation due to great brake actuating forces from leading to an increase of the length of the strut 24.

The pressure of spring 50 acts against the engagement of the locking tooth 48 into the locking serration 38. As the rigidity of the spring decreases at rising temperature, the value of the brake actuating force at which the locking tooth 48 engages in the locking serration 38 to prevent an increase in length of the strut 24 and which is to be applied by the piston 18 also diminishes accordingly.

As the rigidity of the spring 50 is reduced at rising temperature, the spring 50 also applies less resistance against any possible pivoting of the locking lever 46 about the bolt 44 as the temperature rises. Such pivoting of the locking lever 46 is aimed at by the effect of the hydrostatic pressure as well as the spring pressure of a spring (not shown) disposed between the two pistons 18, 20 and acting on the piston 18 against the shoe restoring spring 22, also when the brake is released. The pivoting of the locking lever 46 results in a reduction of the salient distance a. If the temperature of the brake surpasses a predeterminable value which lies approximately at 150° C., the rigidity of the spring 50 has become so low that pivoting of the locking lever 46 occurs in such manner that the salient distance a is totally reduced so that the piston 18 directly engages the side facing it of the web plate 6. When actuating a heated brake, therefore, only a loss distance must be overcome which is determined by the salient portion and reduced as compared to the cold state of the brake because of the reduction of the salient distance a and which is totally cancelled when the temperature of the brake has reached a predeterminable value.

An increase of the pressure in the hydraulic brake actuator required with highly heated brakes to balance the reduced frictional value of the friction lining 10 thus becomes possible in effective manner without a loss distance first having to be passed by an increase of the volume of the hydraulic fluid. The pivoting of the locking lever 46 about the bolt 44 caused by the brake actuating force transmitted by the piston 18 and serving to prevent pivoting of the locking lever 34 when a predeterminable value of the brake actuating force is reached, is coupled with a decrease in rigidity of the spring 50 at rising temperature. At increasing temperatures, therefore, the pivoting of the locking lever 46 required for engagement of the locking tooth 48 into the locking serration 38 is caused by lower brake actuating forces below the predetermined value already so that the desired additive joining of the influences of the brake actuating force and the temperature of the brake is achieved. When predetermined values of the brake actuating force and/or temperature are reached, this has the effect that pivoting of the adjusting lever 34 and consequently a change in length of the strut 24 are prevented, with the brake actuated.

Also with the other embodiments the influences of the amounts of the temperature and of the brake actuating force are superposed in similar manner in their effect on a locking member so that excessive adjustment is prevented in dependence on these factors of influence. A reduction of the magnitude of the salient distance a at rising temperature likewise reduces the loss distance caused by this salient portion. The effectiveness of the brake, including its quick response thus is upheld at high temperatures too.

Figure 2:
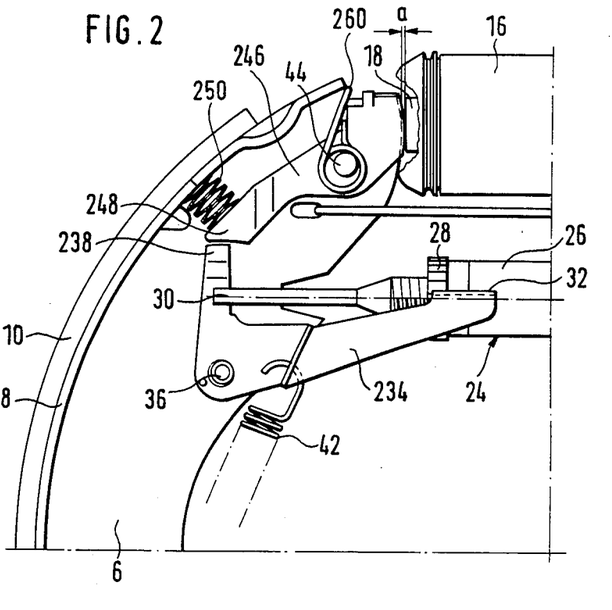
FIG. 2 is an incompletely presented front elevation of a second embodiment of an adjusting device.
Figure 3:
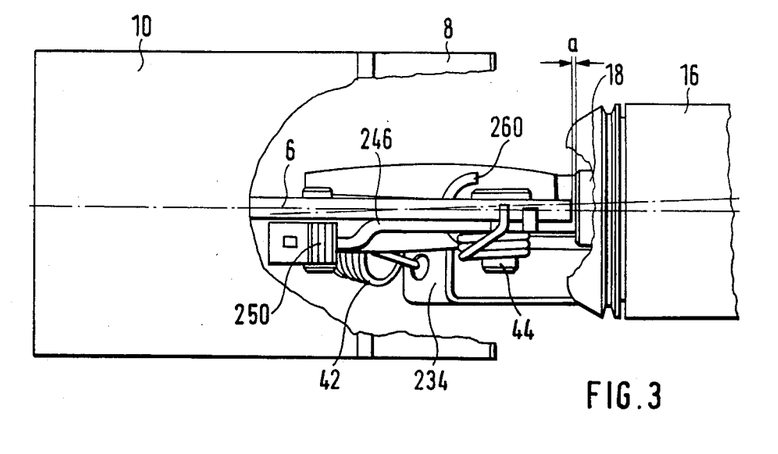
FIG. 3 is a top plan view of the embodiment presented in FIG. 2.

FIGS. 2 and 3 show a second embodiment of an adjusting device. Structural members in agreement with the first embodiment are marked by the same reference numerals. In this embodiment an adjusting lever 234 whose pawl 32 engages in the pinion 28 of the strut 24 is supported for pivoting about a bolt 36. An adjusting spring 42 is attached by one end to the adjusting lever 234 and by the other end to the web plate 6. The adjusting lever 234 comprises a locking serration 238 opposite which there is a correspondingly designed locking tooth 248 of the locking lever 246. Bimetal plate springs 250 are arranged one behind the other next to the locking tooth 248 such that the set of springs acts by one end on the locking lever 246 and by its other end on the lining backplate 8.

In inoperative condition of the brake which then is cold the locking lever 246 has a salient distance of the magnitude a which amounts approximately to 0.2 mm so that the piston 18 abuts against a surface of the locking lever 246. A torsion spring 260 enclosing the bolt 44 and supported at one end on the web plate 6 and at the other end on the locking lever 246 helps to maintain the salient distance a against the bias of the bimetal plate springs 250.

The axial length of the bimetal plate springs 250 increases at rising temperature so that then the locking lever 246 is pivoted and, as a consequence thereof, the salient distance a is reduced and the locking tooth 248 approaches the locking serration 238. When a predeterminable value of the temperature lying at about 150° C. is reached, the locking tooth 248 engages in the locking serration 238 thereby preventing pivoting of the adjusting lever 234 so that the length of the strut 24 is not changed. The reduction of the salient distance a at rising temperature furthermore leads to a reduction of the loss distance which is caused by the salient distance and which is totally cancelled when the salient distance has been eliminated entirely.

Even upon engagement of the locking tooth 248 in the locking serration 238 the bimetal plate springs 250 tend to expand further if the temperature continues to rise. For this reason it is convenient to connect the locking tooth 248 elastically in a manner not shown in detail with the locking lever 246 so that the further expansion of the bimetal plate springs will not result in their plastic deformation.

Figure 4:
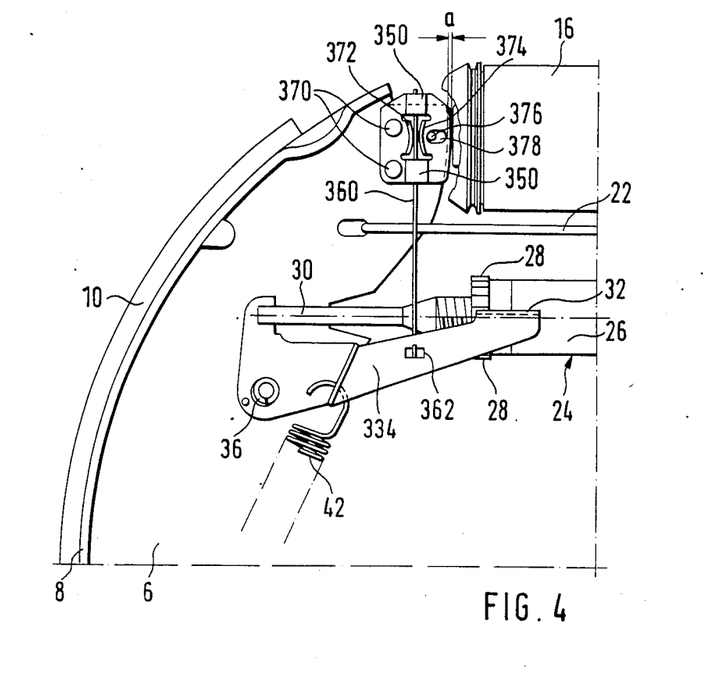
FIG. 4 is an incompletely presented front elevation of a third embodiment of an adjusting device.
Figure 5:
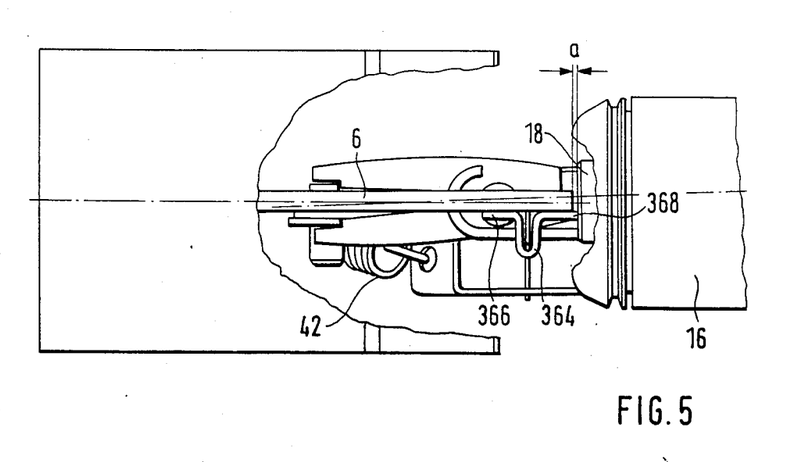
FIG. 5 is a top plan view of the embodiment presented in FIG. 4.

In the third embodiment shown in FIGS. 4 and 5 structural members corresponding with those of the first embodiment are marked by the same reference numerals. In the case of this embodiment the locking member comprises the spring element 350 consisting of a bimetal strip as well as a connecting rod 360 which extends in a direction perpendicular to the axis of the piston 18 and has a hook-shaped end engaging in a recess 362 of the adjusting lever 334. The other end designed to be straight of the connecting rod 360 is embraced by a U-shaped portion 364 of the spring element 350 extending in a direction perpendicular to the axis of the piston 18.

The U-shaped portion 364 of the spring element 350 is directed with its open end to face the web plate 6. Each leg of the U-shaped portion 364 is followed by a flange 366, 368 extending parallel to the web plate 6. The flange 366 remote from the piston 18 is riveted to the web plate 6 by two rivets 370. The flange 368 disposed opposite the piston 18 comprises a salient portion as compared to the end of the web plate 6 and, when the brake is cold and at rest, this reaches a value of about 0.2 mm.

The U-shaped portion 350 is open in its central section at its end opposite the flanges 366, 368 so that there the connecting rods 360 extend between two lips 372, 374. Each of the two lips 372, 374 stands out freely from one of the flanges 366, 368 and is curved in shell shape about its longitudinal axis so that the convexly curved outer surfaces neighboring each other define an intermediate space for receiving the connecting rods 360.

In cold condition the spring 350 is biased by approximately 400 N by means of a pin 376 connected to the web plate 6 and engaging in the flange 368 in a recess 378 of oblong hole shape to serve as a stop for the spring element 350.

The action of the brake actuating force on the flange 368 is followed by displacement of this flange so that the distance between the lips 372, 374 is reduced. When the brake actuating force surpasses a predeterminable value, this leads to clamping of the connecting rod 360 so that the adjusting lever 334 cannot pivot. Just like actuating pressure exerted on the flange 368, also a temperature increase leads to a reduction of the spacing between the lips 372, 374.

As with the embodiments described above, also an increase of the temperature of the brake contributes to a reduction of the salient distance a and consequently of the loss distance to be covered by the piston 18 and to the total cancellation thereof when a value of approximately 150° C. is reached as the temperature rises. Furthermore, pivoting of the adjusting lever 364 is prevented when the temperature reaches a predeterminable value and the value of the actuating force is reduced upon reaching of which the pivoting of the adjusting lever 364 is prevented as the temperature rises.

Figure 6:
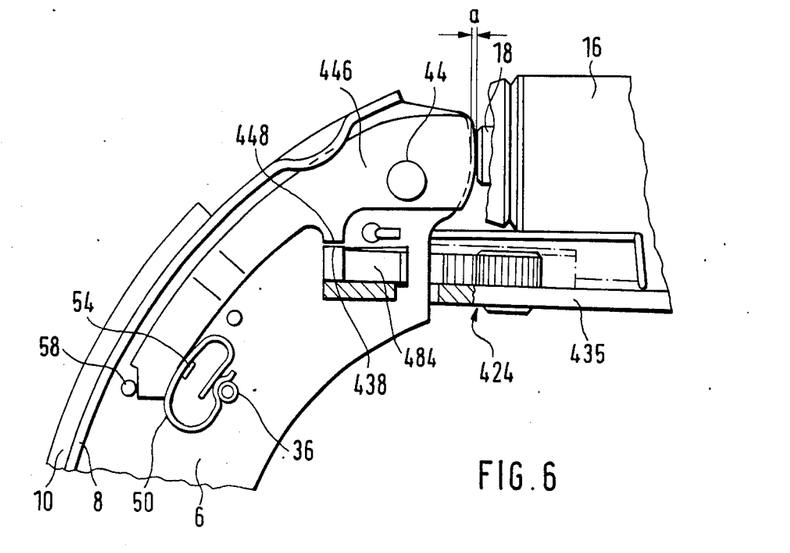
FIG. 6 is an incompletely presented front elevation of a fourth embodiment of an adjusting device.
Figure 7:
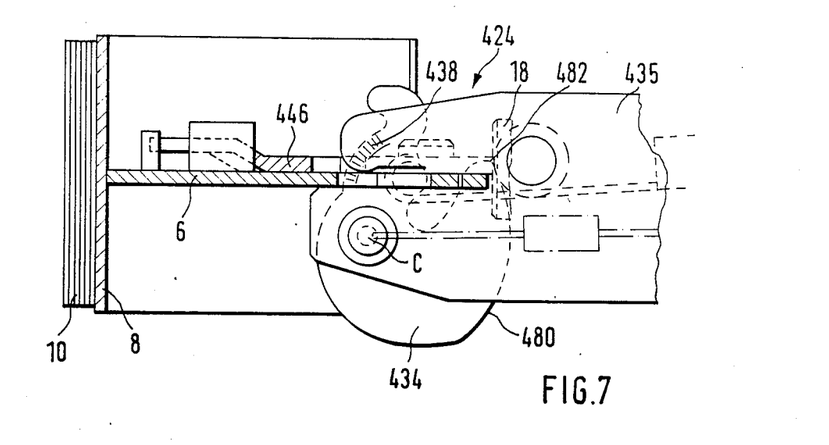
FIG. 7 is a top plan view of the embodiment presented in FIG. 6.

FIGS. 6 and 7 show a fourth embodiment; structural members which are in agreement with the first embodiment are marked by the same reference numerals. The adjustment on which this embodiment is based comprises a strut 424 including a disc-shaped first strut member 434 and a rod-shaped second strut member 435. Strut member 434 is connected pivotably with strut member 435. It comprises an outer surface which is eccentric about the pivot axis C and has a knurled portion 480 in connection with a knurled portion 482 of the second strut member 435 when the brake is at rest. Upon actuation of the brake the two strut members 434, 435 move away from each other. When the brake is actuated, the strut member 434 having an axis of rotation which is arranged to be displaceable in the second strut member 435 in a manner not shown against the pressure of a spring, is pivoted by an arm 484 which engages in a recess of the web plate 6. During the subsequent release of the brake a part of the knurled portion 480 of the first strut member 434 more remote from the pivot axis C comes to be connected with the knurled portion 482 of the second web member so that the strut 424 is extended. The fundamental mode of operation of this adjusting device is described in detail in DE-OS No. 3 244 872. A locking tooth 448 formed at a locking member 446 engages in a locking serration 438 formed at the first strut member 434 in order to prevent a change in length of the strut 424 in response to a predeterminable value of the brake actuating force and/or temperature. In this manner pivoting of the locking member 434 is prevented. The locking member 446 is pivotably connected with the web 6 by a bolt 44 and has a salient distance a as compared to the side of the web plate adjacent the piston 18. At the side of the locking member 446 opposite the salient portion a the latter is engaged by a heat sensitive oval spring 50 which is connected by a bolt 36 with the web plate 6 and biased against a bolt 58 by way of the locking member 446. The cooperation between the spring 50 and the locking member 646 is effected corresponding to the manner described for the first embodiment.

What is claimed is:

1. In an automatic adjusting device for a brake, especially a motor vehicle brake with which a strut (24) is connected functionally in parallel with a brake actuator (16) and has an effective length which depends on the relative positions of two strut members (26,30) adjustable with respect to each other and one (26) of them having an adjustable portion connectable with an adjusting member by which the strut (24) is extendable upon actuation of the brake and which cooperates with at least one intermediate member (46) normally disposed between a brake shoe web (6) and a piston (18) for transmitting the brake actuating force to the web independently of the strut (24), as long as the brake actuating force does not exceed a predetermined amount, wherein said intermediate member comprises a locking member (46;246;350,360;446) having a side facing the piston (18) of the hydraulic actuator (16) and protrudes a predetermined salient distance (a) beyond the end of the web (6) facing the piston (18), when the brake is at rest, so that the brake actuating force is normally transmissible from the piston (18) to the web (6) by way of the locking member (46;246;350,446) until the salient distance (a) has been reduced by the movement of the locking member (46;246;350,446) relative to said web and the piston (18) abuts against the side of the web, a heat sensitive spring element (50;250;350) cooperating with the locking member (46;246;350,360,446), the characteristics of the spring element being variable with rising temperature of the brake such that movement of the locking member (46;246;350,446) relative to the web results whereby the salient distance (a) is reduced, and means for connecting said locking member (46;246;360,446) with said adjusting member (34,234,334,434) to prevent movement thereof and thus adjustment of said strut upon a predetermined reduction of said salient distance in response to a predetermined amount of at least one of the brake actuating force and a predetermined value of the temperature.

2. The automatic adjusting device as claimed in claim 1, characterized in that the salient distance (a) amounts to about 0.2 mm when the brake is at rest.

3. The automatic adjusting device as claimed in one of claims 1 or 2, characterized in that
   the strut (24) comprises a spindle (26) having a thread section as the adjustable portion which is variable in length in the direction of the longitudinal axis of the strut (24) by means of a pinion (28),
   a sleeve (30) of the strut (24) borders on the side of the pinion (28) opposite the spindle (26),
   the adjusting member is an adjusting lever (34) pivotably connected with the web plate (6) and engaging in the pinion (28) to vary the length of the strut (24),
   the locking member is a locking lever (46;246) pivotably connected with the web plate (6) by a bolt (44),
   a locking tooth (48;248) is formed at the end of the locking lever (46;246) opposite the end forming the salient portion (a),
   a locking serration (38;238) is formed at the side of the adjusting lever (34,234) opposite the locking tooth (48;248) and engaged by the locking tooth (48;248) to prevent pivoting of the adjusting lever (34;234) against the action of the spring element (50;260) upon reaching of a predetermined value of at least one of the brake actuating force the temperature.

4. The automatic adjusting device as claimed in claim 3, characterized in that
   the spring element (50) is biased in cold condition and consists of a bimetal strip bent to oval shape,
   the two ends of the bimetal strip constitute one longitudinal side of the oval, overlapping each other at a distance, said side being connected to the web plate (6) by a bolt (36), and
   the opposite longitudinal side of the oval abuts against the locking lever (46).

5. The automatic adjusting device as claimed in claim 4, characterized in that the locking lever (46) has a bent portion at the end adjacent the locking tooth (48) which portion serves as stop (56) for an abutment bolt (58) connected to the web plate (6) at the side of the locking lever (46) opposite the spring element (50).

6. The automatic adjusting device as claimed in claim 5, characterized in that the locking lever (46) comprises a projection (54) for connection to the spring element (50) at the side facing the spring element (50).

7. The automatic adjusting device as claimed in claim 6, characterized in that the longitudinal side of the spring element (50) abutting against the locking lever (46) comprises a recess which is engaged by the projection (54) of the locking lever (46), and in that an eye (52) receiving the bolt (36) for fixing the spring element (50) with the web plate (6) is formed in the outer end portion of the bimetal strip.

8. The automatic adjusting device as claimed in one of claims 1 or 2, characterized in that the locking member comprises the spring element (350) which is biased and firmly connected at one side with the web plate (6) as well as a connecting rod (360) which is connected at one end with the adjusting lever (334) and the end portion of which opposite the adjusting lever (334) is passed through a region of the spring element (350) and adapted to be clamped in the same when the value of at least one of the brake actuating force and the temperature has reached a predetermined value so that pivoting of the adjusting lever (334) is prevented.

9. The automatic adjusting device as claimed in claim 8, characterized in that
the spring element (350) comprises a U-shaped portion (364) bent of a bimetal strip to receive an end portion of the connecting rod (360), the opening thereof facing the web plate (6) and the outer metal strip expanding more than the inner metal strip at rising temperature,
each of the two legs of the U-shaped portion (364) is followed by a flange (366,368) which extend parallel to the web plate (6) and one of which is riveted to the web plate (6), while the other flange (368) directed toward the piston (18) forms the salient portion (a), and
there is a section within the U-shaped portion (350) whose end located opposite the flanges (366,368) is opened such that lips (372,374) extend as far as the flanges (366,368) which lips are of shell shape and spaced from each other such that the convexly curved sides of the lips (372;374) face each other so that the connecting rod is adapted to be clamped after a reduction of the spacing between the lips (372,374).

10. The automatic adjusting device as claimed in claim 9, characterized in that the spring element (350) is biased by a pin connected to the web plate (6) and engaging in a recess of the flange (368) facing the piston (18).

11. The automatic adjusting device as claimed in claim 1, characterized in that a torsion spring (260) cooperates with the locking lever (246) and the heat sensitive spring element comprises a plurality of biased bimetal plate springs (250) arranged in behind one another which are disposed between a lining backplate (8) and a part of the locking lever (246) and the axial length of which increases at rising temperature, the locking tooth (248) being connected elastically with the locking lever (246).

12. The automatic adjusting device as claimed in one of claims 1 or 2, characterized in that
the strut (424) comprises a disc-shaped first strut member (434) designed as adjusting member and pivotably connected to a rod-shaped second strut member (435) in a direction transversely of the longitudinal direction of the strut (424) and displaceable against the pressure of a spring,
the first strut member (434) has an outer surface which is eccentric with respect to the pivot axis (C) and has a knurled section which is in engagement with a knurled section (482) of the second strut member (435) when the brake is at rest,
that the first strut member (434) is pivotable by means of an arm engaging in a recess of the web plate (6), upon actuation of the brake,
the locking member (446) is pivotably connected with the web plate (6) and comprises a locking tooth (448) adapted to be caught in a locking serration (438) of the first strut member (434) to prevent pivoting of the first strut member (434), and
the heat sensitive spring element (50) is guided at the web (6) and acts against the biased locking member (446).

* * * * *